April 11, 1950 H. R. WARNKE 2,503,857

POLARIZED ELECTROMAGNET FOR TELEPHONE INSTRUMENTS

Filed Nov. 7, 1945 2 Sheets-Sheet 1

Inventor

Herbert R. Warnke

By Watson, Cole, Grindle & Watson

Attorney

April 11, 1950

H. R. WARNKE

POLARIZED ELECTROMAGNET FOR TELEPHONE INSTRUMENTS 2,503,857

Filed Nov. 7, 1945

2 Sheets-Sheet 2

Inventor

Herbert R. Warnke

By Watson, Cole, Grindle & Watson

Attorney

Patented Apr. 11, 1950 2,503,857

UNITED STATES PATENT OFFICE 2,503,857

POLARIZED ELECTROMAGNET FOR TELEPHONE INSTRUMENTS

Herbert R. Warnke, East Orange, N. J., assignor to United States Instrument Corporation, East Orange, N. J., a corporation of New Jersey Application November 7, 1945, Serial No. 627,207

2 Claims. (Cl. 175—339)

This invention relates to telephone instruments and more particularly to instruments of the permanent magnet type which are adapted to be used either as transmitters or receivers, in circuits which do not include a source of electric energy other than the instrument itself, such instruments being known as "sound-powered" telephone instruments.

A principal object of the present invention is the provision of an instrument of the class described which presents certain improvements and advantages over the instrument described in United States Patent No. 2,245,511, granted to Arthur Turnbull, Jr., and Herbert R. Warnke. The telephone instrument constructed according to the aforesaid United States patent is very efficient in operation and is entirely satisfactory for most purposes. However, in common with other telephone instruments both of the sound-powered type and of the battery-powered type, the instrument disclosed in the Turnbull and Warnke patent, while very compact and of acceptable dimensions for most purposes, is of a thickness such as to render it unsuitable for use as a head set when the user of the instrument desires or is required to wear a head covering over the head set. For example, in military use it is desirable that persons employed in combat zones be protected by steel helmets, but it is found that a head set comprising a telephone instrument of the customary thickness cannot be worn under the usual steel helmet furnished to military and naval personnel, while a helmet sufficiently large to accommodate such a head set is extremely clumsy and cumbersome.

An important advantage of the present invention resides in the fact that the instrument to be hereinafter described is sufficiently thin that it may be worn over the ear of an operator without interfering with the use of an ordinary protective helmet, i. e., a helmet such as is presently in common use by the armed forces.

Accordingly it is an object of the present invention to provide a telephone instrument of unusual thinness as compared to similar instruments heretofore in use, and possessing the aforesaid advantages.

A further object is the provision of a telephone instrument comprising opposing pole-pieces defining an air gap therebetween, an armature extending through the air gap, and a coil unit surrounding the armature and adapted to be connected in a telephone circuit, the opposing pole-pieces being recessed or cut away in their central portions in such a way that the adjacent portion of the coil unit is received in the recessed or cut away portion of each respective pole-piece, thereby permitting the pole-pieces to be spaced more closely together and thus reducing the overall thickness of the instrument.

A further object is the provision of an instrument of the type described, in which the openings or recesses in the pole-pieces are employed for supporting and centering the coil unit accurately in position whereby, when the pole-pieces are secured in place, no other support for the coil unit is required.

In some cases it may be found that forming the pole-pieces with the openings or cut away portions mentioned above may result in undesirably reducing the field strength of the magnetic circuit by increasing the reluctance thereof by the removal of metal. In such cases the field strength may be restored by partially filling the said openings in the pole-pieces by thin inserts of metal of high permeability as compared with the metal of the pole-piece proper. Such high permeability metals are well known in the art and need not be described.

Accordingly, it is an object of the present invention to provide a telephone instrument of the type described, in which the thickness of the instrument is reduced by forming the pole-pieces with openings therethrough to receive adjacent portions of the intervening coil unit, and in which the field strength of the magnetic circuit is preserved by the use of high permeability inserts partially filling said openings.

Other and further objects and advantages will be apparent from the description which follows, taken in connection with the accompanying drawings in which Figure 1 is an elevational view of the telephone instrument with the cover plate removed;

Figure 1*a* is a plan view of the coil unit which forms a part of the instrument;

In order to facilitate an understanding of the invention, reference is made to the embodiments thereof shown in the accompanying drawings, and detailed descriptive language is employed. It will nevertheless be understood that no limitation of the invention is thereby intended and that various changes and alterations are contemplated such as would ordinarily occur to one skilled in the art to which the invention relates.

Figures 1, 1A, 2, 3, 4, 5, 6:
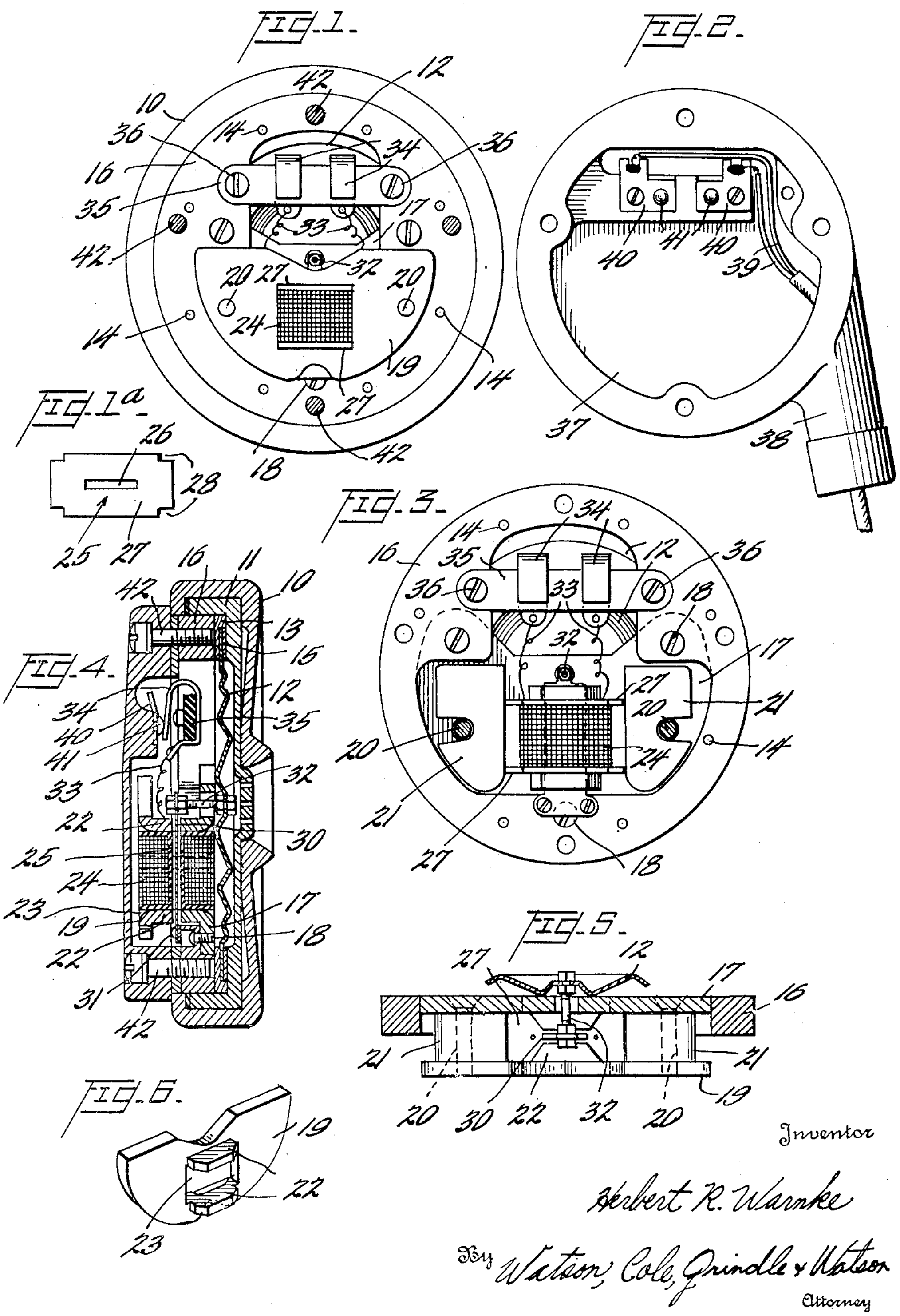
Figure 2 is an elevational view of the rear or innerface of the cover plate.
Figure 3 is a view similar to Figure 1, but with the upper pole-piece removed in order to show the coil, magnet and armature assembly.
Figure 4 is a vertical transverse section through the assembled instrument.
Figure 5 is a partial horizontal sectional view illustrating the pole-piece and magnet assembly.
Figure 6 is a perspective view of one form of pole-piece employed in the present invention.

Referring now to Figures 1, 2 and 3, the reference character 10 denotes an ear cushion of rubber or other suitable material which forms no part of the instrument proper but is employed for the comfort of the user of the instrument. The cushion 10 is suitably secured, preferably elastically, over the backing plate 11. A diaphragm 12 is clamped against the backing plate 11 by means of a ring 13 secured to the backing plate by screws 14, a thin gasket or shim 15 of cushioning material being preferably interposed between the diaphragm 12 and the backing plate 11. The instrument base 16, which is generally annular in form, provides the main support for the various electrical and magnetic elements of the instrument, and is likewise secured to the backing plate by the screws 14.

The rear or lower pole-piece 17 is let into the rear face of the instrument base 16 and secured thereto by screws 18, being best illustrated in Figure 3. The forward or upper pole-piece 19 is secured to the rear or lower pole-piece 17 by screws 20 which also serve to position and clamp the permanent magnets 21 tightly between the two pole-pieces.

As best seen in Figure 6, the pole-piece 19 is formed with two spaced projecting pole-tips 22, the material of the pole-piece being entirely cut away between the two pole-tips to provide an opening 23 The rear pole-piece 17, although of different outline from the pole-piece 19 for purposes of securing it to the instrument base, is identical in respect to the pole-tips and the opening therebetween.

The telephone coil 24, best seen in Figures 3 and 4, is wound upon a coil form 25 of rigid insulating material such as a suitable plastic or composition material which provides, in plan (see Figure 1*a*) a central opening 26 for the armature and top and bottom flanges 27 which are notched at each corner as at 28 so that the longer edges of said flanges, exclusive of the notched-out portions, fit snugly within the openings 23 of the respective pole-pieces. By this means the coil is accurately positioned and supported by the pole-pieces without the necessity of employing other securing means for the coil unit. Also, by virtue of the described arrangement, the overall thickness of the instrument is reduced by twice the thickness of the material of a pole-piece.

An armature 30 is secured at its lower end to the instrument base 16 by screws 31 and extends upwardly through the central opening 26 in the coil unit, the armature being adjustably connected at its upper end, by means of a threaded rod 32, to the diaphragm 12.

The leads 33 from the coil unit are connected to contact members 34 carried by an insulating support member 35 secured to the instrument base by screws 36.

The cover plate 37 is preferably formed of lightweight material, for example aluminum, and is recessed to accommodate the electrical and magnetic elements of the instrument as shown in Figures 2 and 3. A hollow projection 38 is provided for receiving and guiding the conductors 39 into the instrument where they are secured to contact members 40 carried on the interior of the cover plate. The contact members 40 are provided with contact points 41 which, when the cover plate is secured in place, make contact with the spring contact members 34. The cover plate is adapted to be secured to the instrument base by screws 42.

The principle of operation of the described telephone instrument is identical with that of the aforesaid United States Patent No. 2,245,511, to which reference is made for a complete explanation thereof, the electrical and magnetic functions involved in such operation having no part in the present invention.

Figures 7, 8, 9, 10, 11, 12, 13, 14:
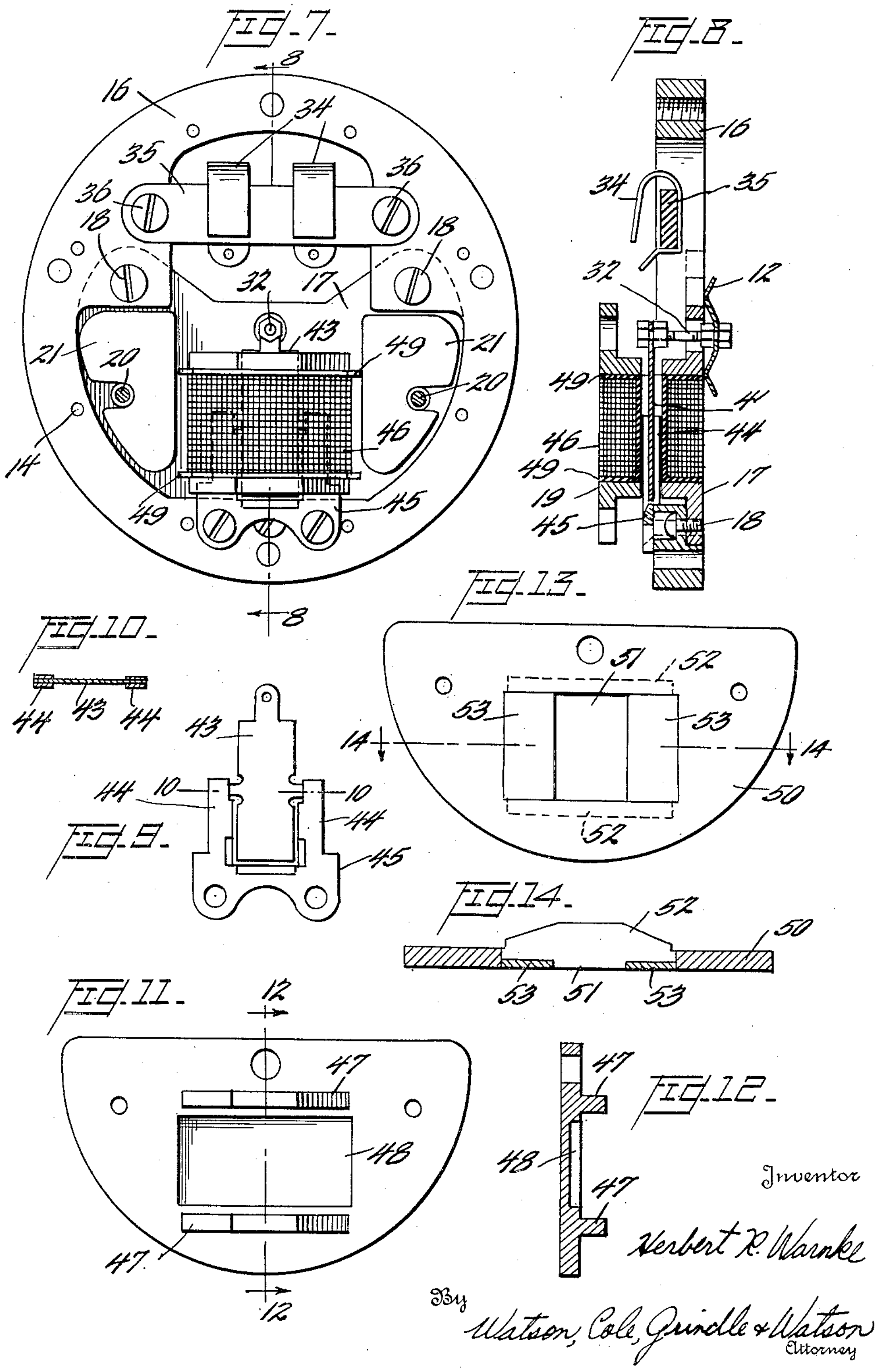
Figure 7 is a view similar to Figure 3 illustrating a modification in which different forms of armature and coil unit are employed.
Figure 8 is a section on line 8—8 of Figure 7.
Figure 9 is a detail of the armature construction employed.
Figure 10 is a section on line 10—10 of Figure 9.
Figure 11 is an elevational view of a modified form of pole-piece.
Figure 12 is a section on line 12—12 of Figure 11.
Figure 13 is an elevational view of a still further modified pole-piece.
Figure 14 is a section on line 14—14 of Figure 13.

Referring to Figures 7, 8, 9 and 10, the construction disclosed is identical with that described above, except that a centrally supported armature, shown in detail in Figures 9 and 10 is employed instead of the cantilever armature 30 of Figures 3 and 4. Inasmuch as the armature 43 of Figure 9 is supported at its midpoint in the bifurcated arms 44 of the yoke member 45 the coil unit 46 (Figure 7) must be modified to provide a larger central opening to accommodate the arms 44 of the yoke member 45. Accordingly, the openings in the respective pole-pieces are made longer, to accommodate the increased transverse dimension of the coil unit. In such a case it may be found that the increased dimensions of the openings in the pole-pieces increase, to an undesirable extent, the reluctance of the magnetic circuit thereby reducing the field strength to a point where the operation of the instrument may be impaired. To overcome this difficulty the expedients illustrated in Figures 11–14 may be employed.

Figures 11 and 12 illustrate a pole-piece in which the material between the pole-tips 47 is cut away to form a recess 48 rather than an opening extending entirely through the pole-piece. The flanges 49 of the coil unit 46 are received between the walls of the recess 48 in a manner similar to the manner in which the flanges 27 of the coil unit 25 are received within the openings 23 in the previously described exemplification of the invention. Inasmuch as the coil unit 46 is greater in its transverse dimension than the coil unit 25, it may be made thinner from front to back, thus preserving the advantage of unusual thinness in the assembled instrument.

As an alternative to the expedient just described, the pole-piece may be cut away in its central portion to form an opening extending entirely therethrough as illustrated in Figures 13 and 14, the increased reluctance of the magnetic circuit being then reduced by inserting thin pieces of high permeability metal. Thus in Figures 13 and 14 the pole-piece 50 is cut away to provide an opening 51 between the pole-tips 52, which opening is partially filled adjacent each end thereof by the insertion of a thin piece 53 of high permeab lity metal, one of which is pressed with a firm fit into either end of the opening 51.

The modifications illustrated in Figures 11–14 are not limited to the case of an instrument employing a center suspension armature, but in some cases may be desirable in connection with an instrument employing a cantilever armature as illustrated in Figures 1–4.

From the foregoing description it will be apparent that the objects hereinabove stated have been achieved and an instrument possessing the stated advantages is provided by the present invention.

Having thus described the invention, what is claimed as new and desired to be secured by Letters Patent is:

1. In a telephone instrument, a pair of opposing pole-pieces each having a pair of inwardly projecting pole-tips defining an air gap between said opposed pole-tips, and a coil unit comprising a coil form and a coil adapted to be connected in a telephone circuit, each said pole-piece being formed to provide an opening extending at least partially therethrough between its respective pole-tips, said coil unit being mounted between said pole-pieces so as to extend into said openings and said openings being so formed and proportioned relative to the coil form as to tightly engage the latter so that the coil unit is supported and accurately positioned by said pole-pieces, and means securing said pole-pieces in spaced relationship with said coil form gripped therebetween, said coil form compris ng top and bottom flanges extending with a tight fit into said openings, and also having portions extending between and gripped between and by said opposing pole-pieces.

2. The combination defined in claim 1, said coil form flanges being substantially rectangular in form and having their corners notched out to leave side and end projections thereon.

HERBERT R. WARNKE.

REFERENCES CITED

The following references are of record in the file of this patent:

UNITED STATES PATENTS

| Number | Name | Date |
|---|---|---|
| 934,390 | Conrad | Sept. 14, 1909 |
| 1,719,227 | King | July 2, 1929 |
| 1,863,308 | Jones | June 14, 1932 |
| 2,141,820 | Paredes | Dec. 27, 1938 |
| 2,163,161 | Wadsworth | June 20, 1939 |
| 2,241,105 | Woodruff et al. | May 6, 1941 |
| 2,245,511 | Turnbull | June 10, 1941 |
| 2,391,627 | Howell | Dec. 25, 1945 |
| 2,432,424 | Hyland et al. | Dec. 9, 1947 |
| 2,443,784 | Bullen | June 22, 1948 |